United States Patent
Kim et al.

(10) Patent No.: US 8,705,404 B2
(45) Date of Patent: Apr. 22, 2014

(54) METHOD FOR TRANSMITTING AND RECEIVING SIGNALS USING COLLABORATIVE MIMO SCHEME

(75) Inventors: Jae Wan Kim, Anyang-si (KR); Wook Bong Lee, Anyang-si (KR); Su Nam Kim, Anyang-si (KR); Dong Guk Lim, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/287,032

(22) Filed: Nov. 1, 2011

(65) Prior Publication Data

US 2012/0044830 A1 Feb. 23, 2012

Related U.S. Application Data

(62) Division of application No. 12/318,437, filed on Dec. 29, 2008, now Pat. No. 8,179,819.

(30) Foreign Application Priority Data

Dec. 31, 2007 (KR) .................. 10-2007-0141690
Dec. 1, 2008 (KR) .................. 10-2008-0120603

(51) Int. Cl.
*H04W 72/04* (2009.01)
*H04W 28/12* (2009.01)
*H04W 24/02* (2009.01)

(52) U.S. Cl.
USPC ....... 370/254; 370/329; 455/63.1; 455/114.2; 455/501; 455/509; 375/267

(58) Field of Classification Search
USPC ......... 370/208, 252, 254, 328, 329, 330, 436; 455/63.1, 67.13, 114.2, 296, 303, 423, 455/500, 501, 509, 562.1; 375/278, 346, 375/260, 267, 299, 347
See application file for complete search history.

(56) References Cited

U.S. PATENT DOCUMENTS 6,665,521 B1  12/2003  Gorday et al.
7,826,853 B2 *  11/2010  Molisch et al. ............... 455/450
(Continued)

FOREIGN PATENT DOCUMENTS

CN  1902868 A  1/2007
CN  1989775 A  6/2007
(Continued)

OTHER PUBLICATIONS

Songnan Xi et al., Transmit Beamforming and Detection Design for Uplink Multiuser MIMO Systems, Fortieth Asilomar Conference on Signals, Systems and Comoputers (ACSSC),Nov. 2006, IEEE Xplore, pp. 1593-1600.

(Continued)

*Primary Examiner* — Ahmed Elallam
(74) *Attorney, Agent, or Firm* — McKenna Long & Aldridge LLP

(57) ABSTRACT

A method for reducing inter-cell interference and a method for transmitting a signal by a collaborative MIMO scheme, in a communication system having a multi-cell environment are disclosed. An example of a method for transmitting, by a mobile station, precoding information in a collaborative MIMO communication system includes determining a precoding matrix set including precoding matrices of one more base stations including a serving base station, based on signal strength of the serving base station, and transmitting information about the precoding matrix set to the serving base station. A mobile station in an edge of a cell performs a collaborative MIMO mode or inter-cell interference mitigation mode using the information about the precoding matrix set collaboratively with neighboring base stations.

11 Claims, 5 Drawing Sheets

(56) References Cited

U.S. PATENT DOCUMENTS

| | | |
|---|---|---|
| 7,873,127 B2 | 1/2011 | Francis |
| 7,917,176 B2 | 3/2011 | Khojastepour et al. |
| 8,140,019 B2 * | 3/2012 | Kim et al. ............... 455/63.1 |
| 8,179,819 B2 * | 5/2012 | Kim et al. ............... 370/254 |
| 8,190,094 B2 * | 5/2012 | Kim et al. ............... 455/63.1 |
| 8,369,788 B2 * | 2/2013 | Kim et al. ............... 455/63.1 |
| 8,374,650 B2 * | 2/2013 | Kotecha et al. ........... 455/561 |
| 8,428,162 B2 * | 4/2013 | Forenza et al. ........... 375/260 |
| 8,457,008 B2 * | 6/2013 | Lim et al. ............... 370/252 |
| 2006/0120477 A1 | 6/2006 | Shen et al. |
| 2007/0092019 A1 | 4/2007 | Kotecha et al. |
| 2007/0099578 A1 | 5/2007 | Adeney et al. |
| 2007/0115909 A1 | 5/2007 | Wang et al. |
| 2007/0133707 A1 * | 6/2007 | Hwang et al. ............ 375/267 |
| 2007/0165738 A1 * | 7/2007 | Barriac et al. ........... 375/267 |
| 2007/0223423 A1 | 9/2007 | Kim et al. |
| 2007/0248172 A1 | 10/2007 | Mehta et al. |
| 2007/0280116 A1 | 12/2007 | Wang et al. |
| 2008/0080459 A1 * | 4/2008 | Kotecha et al. ........... 370/342 |
| 2008/0080634 A1 * | 4/2008 | Kotecha et al. ........... 375/267 |
| 2008/0117833 A1 | 5/2008 | Borran et al. |
| 2008/0130790 A1 * | 6/2008 | Forenza et al. ........... 375/299 |
| 2008/0214196 A1 * | 9/2008 | Sambhwani et al. ........ 455/446 |
| 2008/0233967 A1 | 9/2008 | Montojo et al. |
| 2008/0260059 A1 | 10/2008 | Pan |
| 2009/0041148 A1 | 2/2009 | Li et al. |
| 2009/0046800 A1 | 2/2009 | Xu et al. |
| 2009/0047971 A1 | 2/2009 | Fu |
| 2009/0067375 A1 * | 3/2009 | Wong et al. ............. 370/329 |
| 2009/0086861 A1 | 4/2009 | Yavuz et al. |
| 2009/0117911 A1 * | 5/2009 | Molisch et al. ........... 455/450 |
| 2010/0035627 A1 | 2/2010 | Hou et al. |
| 2010/0232534 A1 | 9/2010 | Lee et al. |
| 2010/0309996 A1 * | 12/2010 | Lim et al. ............... 375/260 |
| 2010/0309998 A1 * | 12/2010 | Jung et al. ............... 375/260 |

FOREIGN PATENT DOCUMENTS

| | | |
|---|---|---|
| EP | 2 051 400 A2 | 4/2009 |
| EP | 2 051 401 A2 | 4/2009 |
| JP | 2006-106613 | 4/2006 |
| JP | 2006-157848 | 6/2006 |
| JP | 2008-269015 | 11/2008 |
| JP | 2009-514400 A | 4/2009 |
| JP | 2009-105893 A | 5/2009 |
| JP | 2010-508779 A | 3/2010 |
| JP | 2010-522516 A | 7/2010 |
| JP | 2010-538577 A | 12/2010 |
| KR | 10-2005-0000201 | 1/2005 |
| KR | 10-0621432 | 9/2006 |
| KR | 10-2006-0119144 | 11/2006 |
| KR | 10-2007-0085471 | 8/2007 |
| KR | 10-2007-0086976 | 8/2007 |
| KR | 10-0761818 | 9/2007 |
| KR | 10-2007-0113972 | 11/2007 |
| KR | 10-2008-0084087 | 9/2008 |
| KR | 10-0883915 | 2/2009 |
| WO | WO2006/019263 | 2/2006 |
| WO | WO 2006/063138 A3 | 6/2006 |
| WO | WO 2006/093385 | 9/2006 |
| WO | WO 2007/050924 | 5/2007 |
| WO | WO 2007/123029 A1 | 11/2007 |
| WO | WO 2009/031757 | 3/2009 |
| WO | WO 2009/057400 A2 | 5/2009 |

OTHER PUBLICATIONS

Younsun Kim et al., Multi-Cell Cooperative Transmission, Conference Record of the Forty-First Asilomar Conference on Signals, Systems and Computers (ACSSC 2007), Nov. 2007, pp. 448-452.

MIMO-TDD vol. 106, No. 555, pp. 91-94, Feb. 28, 2007.

InterDigital Communications et al., MU-MIMO Codebook Selection and Signaling Considerations for E-UTRA, 3GPP R1-074469, Oct. 12, 2007.

Love et al. "Grassmannin Beamforming for Multiple-Input Multiple Output Wireless Systems", IEEE Transactions on Information Theory vol. 49, No. 10, Oct. 2003, pp. 2735-2747.

* cited by examiner

METHOD FOR TRANSMITTING AND RECEIVING SIGNALS USING COLLABORATIVE MIMO SCHEME

CROSS-REFERENCE TO RELATED APPLICATIONS

This application is a divisional of and claims the benefit of U.S. application Ser. No. 12/318,437, filed Dec. 29, 2008 now U.S. Pat. No. 8,179,819, which claims the benefit of Korean Patent Application No. 10-2007-0141690, filed on Dec. 31, 2007 and Korean Patent Application No. 10-2008-0120603, filed on Dec. 1, 2008, each of which are hereby incorporated by reference as if fully set forth herein.

BACKGROUND OF THE INVENTION

1. Field of the Invention

The present invention relates to a communication system of a multi-cell environment, and more particularly, to a method for reducing inter-cell interference in a multi-cell environment and a method for transmitting and receiving a signal by a collaborative multiple-input multiple-output (MIMO) scheme.

2. Discussion of the Related Art

With the popularization of information communication services, the emergence of various multimedia services, and the provision of high-quality services, demand for a wireless communication service has rapidly increased. To actively cope with such demand, the capacity of a communication system should be increased and the reliability of data transmission should be improved.

To increase communication capacity in wireless communication environments, a method for newly searching available frequency bands and a method for increasing efficiency for limited resources may be considered. As to the latter method, a multiple-input multiple-output (MIMO) scheme has recently drawn attention and has been actively developed. The MIMO scheme obtains a diversity gain by equipping a transmitter and a receiver with a plurality of antennas to additionally ensure a spatial region for utilizing resources, or increases transmission capacity by transmitting data in parallel via the plurality of antennas.

Generally, the MIMO scheme is considered to raise the reliability of a communication system or to improve transmission efficiency and may be classified into beamforming, spatial diversity, and spatial multiplexing schemes.

The beamforming scheme and spatial diversity scheme, which use multiple transmit antennas to raise reliability, transmit a single data stream through multiple transmit antennas. The spatial multiplexing scheme, used to raise transmission efficiency, simultaneously transmits multiple data streams via multiple transmit antennas.

In the spatial multiplexing scheme, the number of simultaneously transmitted data streams is called a spatial multiplexing rate. The spatial multiplexing rate should be appropriately selected according to the number of transmit and receive antennas and to a channel state. Generally, the spatial multiplexing rate which can maximally be obtained is limited to a smaller value of the number of transmit antennas and the number of receive antennas. If correlation of a channel is increased, a low spatial multiplexing rate is used.

When employing the spatial multiplexing scheme, various gains can be obtained by applying a virtual antenna signaling scheme. For example, since channel environment of multiple data streams become the same by application of the virtual antenna signaling scheme, robust channel quality information (CQI) can be provided and the reliability of a data stream having a bad channel state can be increased.

Further, a transmit power of physical antennas to which a virtual antenna signaling scheme is applied can be nearly uniformly maintained. In more detail, sets of physical transmit antennas form a plurality of beams each corresponding to a virtual antenna. Different beams are generated not only to transmit the same power from all the physical antennas but also to reserve a channel characteristic.

The total number of virtual antennas determines an available spatial diversity or spatial multiplexing rate. Moreover, the total number of virtual antennas determines the amount of overhead required to measure space channels. Hereinbelow, the number of physical transmit antennas is denoted by Mr, the number of available virtual transmit antennas is denoted by Me, and the number of simultaneously transmitted layers is denoted by M. The layer indicates a transmission symbol which is independently coded and modulated for transmission.

Meanwhile, a precoding scheme refers to a spatial processing scheme to raise the reliability of a communication system and to improve transmission efficiency. The precoding scheme can be used irrespective of a spatial multiplexing rate in a multiple antenna system and increases a signal-to-noise ratio (SNR) of a channel. Generally, a transmitting side multiplies the most proper matrix or vector in a current channel environment by data for transmission. The multiplied matrix or vector is fed back from a receiving side. If the transmitting side can determine channel information of a downlink, a proper matrix or vector can be selectively used.

SUMMARY OF THE INVENTION

An object of the present invention devised to solve the problem lies in providing a method for efficiently reducing inter-cell interference in a multi-cell environment and a method for transmitting and receiving a signal by a collaborative MIMO scheme.

One aspect of the present invention for achieving the object provides a method for mitigating, by a mobile station, inter-cell interference in a multi-cell environment.

In one embodiment, a method for mitigating inter-cell interference includes measuring the channel from at least one neighboring base station generating interference with a signal received from a serving base station, determining at least one of a first precoding matrix index in which the interference is maximized and a second precoding matrix index in which the interference is minimized, wherein the first and second precoding matrix indexes are determined based on the measured channel, and transmitting the at least one of the first and second precoding matrix indexes to the serving base station together with corresponding base station identifier information.

The first precoding matrix index may be a precoding matrix index for requesting the at least one neighboring base station to restrict use of the precoding matrix index, and the second precoding matrix index may be a precoding matrix index for requesting the at least one neighboring base station to recommend use of the precoding matrix index.

The transmitting of the at least one of the first and second precoding matrix indexes may further transmit interference amount information from the at least one neighboring base station.

Two or more first precoding matrix indexes and two or more second precoding matrix indexes may be determined in order of maximum interference or minimum interference based on the measured channel and may be transmitted to the serving base station.

The first and second precoding matrix indexes transmitted to the serving base station together with the base station identifier information may be transmitted to a neighboring base station corresponding to the base station identifier information via the serving base station.

In another embodiment, a method for mitigating inter-cell interference includes measuring the channel from at least one neighboring base station generating interference with a signal received from a serving base station, and calculating an interference value based on the measured channel signal and transmitting the interference value to the serving base station, wherein the interference value is used to determine priority for selection of a precoding matrix index in each base station, and information about the priority is transmitted from the serving base station to the at least one neighboring base station.

The interference value may include at least one of signal to interference plus noise ratio (SINR), normalized interference power, and interference over thermal (IoT).

The priority for the selection of the precoding matrix index may be used to determine the precoding matrix index used in each base station, when a request for use restriction of a specific precoding index and a request for use recommendation of the specific precoding index from two or more mobile stations collide.

The measured interference value is transmitted to the serving base station together with corresponding base station identifier information.

The method may further includes, after measuring the channel, determining at least one of a first precoding matrix index in which interference is maximized and a second precoding matrix index in which interference is minimized, and transmitting the at least one of the first and second precoding matrix indexes to the serving base station together with corresponding base station identifier information.

Another aspect of the present invention for achieving the object provides a method for mitigating, by a specific base station, inter-cell interference in a multi-cell environment.

In one embodiment, a method for mitigating inter-cell interference includes receiving, from a mobile station, at least one of a first precoding matrix index in which interference is maximized and a second precoding matrix index in which the interference is minimized, together with corresponding base station identifier information, wherein the interference is generated by a channel signal of at least one neighboring base station with respect to a signal transmitted by the specific base station to the mobile station, and transmitting the at least one of the first and second precoding matrix indexes to the at least one neighboring base station according to the base station identifier information.

In another embodiment, a method for mitigating inter-cell interference includes receiving, from a mobile station, an interference value used to determine priority for selection of a precoding matrix in each base station, and transmitting priority information based on the interference value to at least one neighboring base station, wherein the interference value is the amount of interference caused by a channel signal of at least one neighboring base station with respect to a signal transmitted to the mobile station by the specific base station.

A further aspect of the present invention provides a method for receiving, by a mobile station, a signal by a collaborative multiple-input multiple-output (Co-MIMO) scheme in a multi-cell environment.

In one embodiment, a method for receiving a signal by a collaborative MIMO scheme includes measuring a channel signal received from a serving base station and collaborative base stations including at least one neighboring base station, wherein the collaborative base stations perform the collaborative MIMO scheme together with the serving base station, determining precoding matrix indexes for each of the collaborative base stations and reporting the precoding matrix indexes to the serving base station, and receiving the same signal or independent signals from the collaborative base stations.

The precoding matrix indexes for each of the collaborative base stations may be selected based on a codebook predetermined by a system.

The precoding matrix indexes for each of the collaborative base stations may be determined by selecting precoding matrix indexes in which a multi-cell diversity gain or a multi-cell multiplexing gain is maximally obtained, when the mobile station collaboratively receives the same signal or independent signals from the collaborative base stations.

The precoding matrix indexes for each of the collaborative base stations may be determined by sequentially selecting a prescribed number of precoding matrix indexes in which a multi-cell diversity gain or a multi-cell multiplexing gain is maximally obtained, when the mobile station collaboratively receives the same signal or independent signals from the collaborative base stations.

The collaborative base stations may share resource allocation information for the mobile station and transmit the same signal or independent signals to the mobile station using a common resource.

The precoding matrix indexes reported to the serving base station may be respectively transmitted from the serving base station to the collaborative base stations via an interface between networks, for example, via a backbone network connecting the base stations.

The mobile station may receive the same signal from the collaborative base stations when the collaborative base stations are operated in a multi-cell diversity mode, and the mobile station may receive the independent signals from the collaborative base stations when the collaborative base stations are operated in a multi-cell multiplexing mode.

Another aspect of the present invention provides a method for transmitting, by a specific base station, a signal together with at least one neighboring base station by a collaborative MIMO scheme.

In one embodiment, a method for transmitting a signal by a collaborative MIMO scheme includes receiving, from a mobile station that receives a signal by the collaborative MIMO scheme, precoding matrix indexes for each of the specific base station and collaborative base stations including at least one neighboring base station, wherein the collaborative base stations perform the collaborative MIMO scheme together with the specific base station, transmitting the precoding matrix indexes for each of the collaborative base stations to the at least one neighboring base station via an interface between networks, and transmitting the same signal or independent signals to the mobile station together with the at least one neighboring base station.

According to the present invention, inter-cell interference can be efficiently removed in a multi-cell environment and a signal can be efficiently transmitted and received by a collaborative MIMO scheme.

When transmitting a data signal of one mobile station from a plurality of base stations in a multi-cell environment, closed-loop precoding can be performed by sharing precoding matrix information transmitted from the mobile station.

A scheduler can determine a precoding matrix of a plurality of adjacent base stations by combining precoding matrix information received from the mobile station. Since channels of the adjacent base stations are considered, interference entering a corresponding mobile station from the adjacent base stations can be mitigated.

When applying the precoding matrix information to codebook-based MIMO for adjacent base stations, reception performance in a mobile station can be raised by maintaining a unitary characteristic between signals transmitted to the mobile station.

When applying the precoding matrix information to codebook-based beamforming for adjacent base stations, the strength of a signal transmitted to a mobile station can be amplified. Furthermore, interference which may be generated between signals of a plurality of base stations transmitted to the mobile station can be mitigated.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
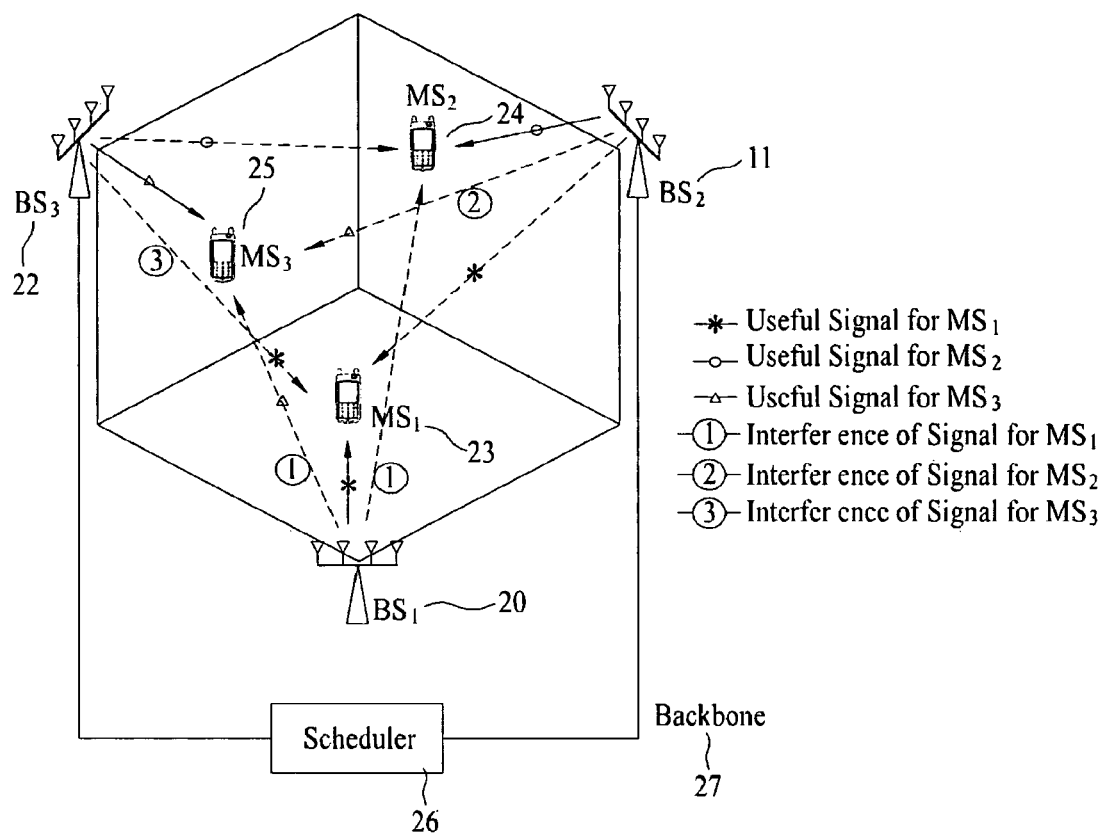
FIG. 1 illustrates signal transmission and reception considering potential interference in a communication system having a multi-cell environment.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or network nodes other than the base station. The term 'base station' may be replaced with the term 'fixed station', 'Node B', 'eNode B' (eNB), 'access point', etc. The term 'mobile station' may be replaced with the term 'user equipment', 'mobile subscriber station' (MSS), etc.

In case of a communicating mobile station, especially, a mobile station in an edge of each cell in a multi-cell environment, a signal transmitted from a serving base station to the mobile station is weak in strength and a probability of generating interference is high due to signals transmitted to the mobile station from other neighboring base stations. Accordingly, the mobile station in an edge of a cell may efficiently mitigate inter-cell interference in consideration of a communication environment or improve reception performance of a user through collaborative MIMO as will be described hereinbelow.

FIG. 1 illustrates the concept of potential interference in signal transmission and reception of a communication system having a multi-cell environment.

When a plurality of base stations located in two or more cell regions transmit signals to one mobile station, interference may occur in a mobile station in one cell due to signals transmitted to mobile stations in other cells, as shown in FIG. 1.

Referring to FIG. 1, mobile stations ($MS_1$, $MS_2$, and $MS_3$) 23, 24, and 25 receive signals from base stations ($BS_1$, $BS_2$, and $BS_3$) 20, 21, and 22. A signal ① transmitted from the base station 20 to the mobile stations 24 and 25 may create interference with respect to the mobile station 23. A signal ② transmitted from the base station 21 to the mobile station 25 may create interference with respect to the mobile station 24. Similarly, a signal ③ transmitted from the base station 22 to the mobile station 23 may create interference with respect to the mobile station 25.

Exemplary embodiments of the present invention which will be described hereinbelow provide a signal transmission method capable of reducing interference caused by signals transmitted from a plurality of base stations, through a closed-loop operation employing a codebook in using precoding information in a communication system having a multi-cell environment.

Figure 2:
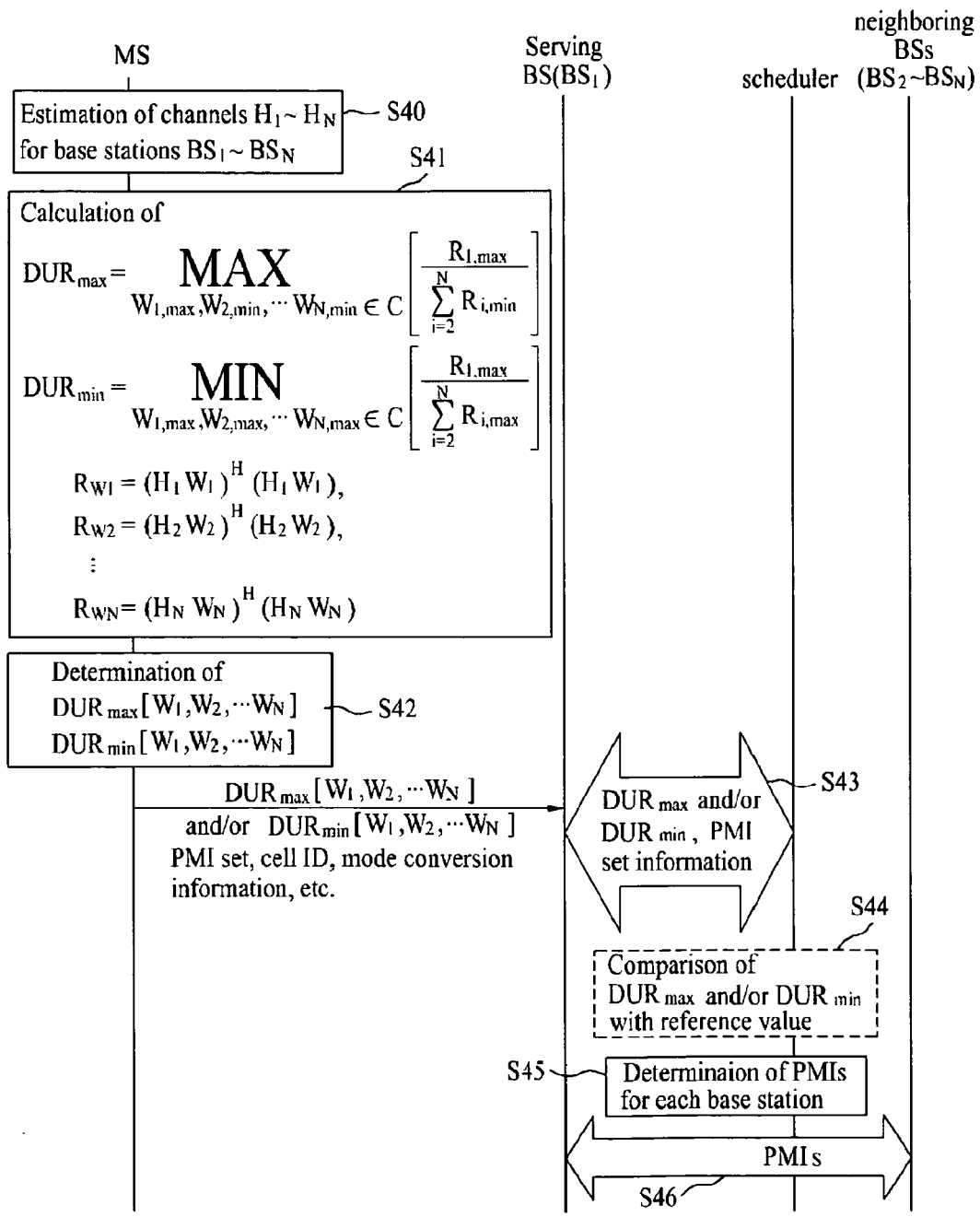
FIG. 2 illustrates a signal transmission and reception method in a communication system having a multi-cell environment according to an exemplary embodiment of the present invention.

FIG. 2 illustrates a signal transmission and reception method in a communication system having a multi-cell environment according to an exemplary embodiment of the present invention.

An example of a method will now be described in detail for minimizing interference in neighboring cells when applying codebook-based closed-loop precoding to a mobile station in an edge of a cell, according to the exemplary embodiment of the present invention.

In step S40, a mobile station, especially, a mobile station positioned in an edge of a cell may perform a channel estimation for the same frequency band of each base station $BS_1$ to $BS_N$ of neighboring cells including a serving base station. The mobile station determines signal strength of each base station based on the channel estimation result for each base station.

The mobile station may detect a codebook index in which signal strength of the serving base station is maximized by minimizing interference and cause the neighboring cells to use the codebook index, thereby minimizing interference in the neighboring cells. Alternatively, the mobile station may cause the neighboring cells not to use a codebook index in which signal strength of the serving base station is minimized by maximizing interference, thereby minimizing interference in the neighboring cells. The above methods may be used simultaneously.

Assuming that the neighboring base stations $BS_1$ to $BS_N$ use a common codebook with respect to the mobile station, for example, the mobile station located in an edge of a cell estimates channels through pilot signals received from the respective base stations in step S40. In step S41, the mobile station calculates covariance values $R_{W1}, R_{W2}, \ldots, R_{WN}$ by sequentially applying a precoding matrix in order of a precoding matrix index (PMI) from the common codebook. Here, subscripts of the covariance values indicate precoding matrices applied to each base station and denote identifiers for discriminating the base stations.

If the mobile station is located in the base station $BS_1$, the values $R_{W2}, R_{W3}, \ldots, R_{WN}$ except for $R_{W1}$ indicating a signal component of the serving base station $BS_1$ may act as interference components.

A method for detecting a codebook index in which signal strength of the base station $BS_1$ is maximized and a method for detecting a codebook index in which signal strength of the base station $BS_1$ is minimized may be expressed by the following Formula 1 and Formula 2, respectively.

$$DUR_{max} = \underset{W_{1,max}, W_{2,min}, \cdots W_{N,min} \in C}{MAX} \left[ \frac{R_{1,max}}{\sum_{i=2}^{N} R_{i,min}} \right] \quad \text{[Formula 1]}$$

$$DUR_{min} = \underset{W_{1,max}, W_{2,max}, \cdots W_{N,max} \in C}{MIN} \left[ \frac{R_{1,max}}{\sum_{i=2}^{N} R_{i,max}} \right] \quad \text{[Formula 2]}$$

In Formula 1 and Formula 2, $W_{i,max}$ denotes a precoding matrix maximizing signal strength of an i-th base station $BS_i$, $W_{i-min}$ denotes a precoding matrix minimizing signal strength of the i-th base station $BS_i$.

$W_{i,max}$ and $W_{i,min}$ may be calculated through codebook search of a channel received from the i-th base station $BS_i$. A precoding matrix having a maximum desired to undesired signal power ratio $DUR_{max}$ or a minimum desired to undesired signal power ratio $DUR_{min}$ may be obtained by calculating $W_{i,max}$ and $W_{i,min}$. Namely, to obtain $DUR_{max}$, a precoding matrix is applied in which signal strength of the serving base station is maximized and signal strengths of neighboring base stations are minimized. To obtain $DUR_{min}$, a precoding matrix is applied in which signal strength of the serving base station is maximized and signal strengths of neighboring base stations are also maximized.

$R_{W1}, R_{W2}, \ldots, R_{WN}$ indicate signal strength of each base station and may be expressed in the form of covariance as shown in the following Formula 3 using, for example, the channel estimated by the mobile station through a signal received from each base station in step S40 and the codebook applied commonly between each base station and the mobile station.

$$R_{W1} = (H_1 W_1)^H (H_1 W_1), \quad \text{[Formula 3]}$$
$$R_{W2} = (H_2 W_2)^H (H_2 W_2),$$
$$\vdots$$
$$R_{WN} = (H_N W_N)^H (H_N W_N)$$

In Formula 3, $H_1, H_2, \ldots, H_N$ indicate channels estimated by the mobile station through signals received from the respective base stations, and $W_1, W_2, \ldots, W_N$ may be determined as specific precoding matrices according to channel estimation of signals received from the base stations among precoding matrices included in the codebook used commonly in the base stations and the mobile station. Namely, signal strength of each precoding matrix is determined by applying the precoding matrices included in the commonly used codebook to Formula 3. $DUR_{max}$ or $DUR_{min}$ in Formula 1 and Formula 2 may be calculated using the determined signal strength of each precoding matrix.

In step S41, the mobile station may calculate $DUR_{max}$ and $DUR_{min}$ by applying the precoding matrix included in a codebook of each base station through Formula 1 to Formula 3. In step S42, the mobile station may construct a precoding matrix set $DUR_{max}[W_1, W_2, \ldots, W_N]$ including precoding matrices of the respective base stations determining $DUR_{max}$ and a precoding matrix set $DUR_{min}[W_1, W_2, \ldots, W_N]$ including precoding matrices of the respective base stations determining $DUR_{min}$.

Next, the mobile station may transmit $DUR_{max}$ and/or $DUR_{min}$ and corresponding precoding matrix set information to the serving base station. The mobile station may further transmit interference control mode start information, corresponding cell identifier (ID), etc. A numeral N may be limited to 1 or 2 in consideration of operational capabilities of the mobile station, overhead for uplink feedback information, interference strength, etc.

The serving base station transmits $DUR_{max}$ and/or $DUR_{min}$ and the precoding matrix set information to a scheduler through a network interface, for example, a backbone network. The serving base station may transmit only the precoding matrix set information considering uplink overhead.

To update PMI, to prevent deterioration in performance due to a transmission delay of the backbone network, and to prevent an increase in overhead of the serving base station, the mobile station may transmit the precoding matrix set information including PMIs of neighboring base stations through an uplink channel of a corresponding base station without passing through the serving base station.

To effectively use wireless resources based on information received via the backbone network, the scheduler may select or combine a precoding matrix suitable for each base station according to a specific scheduling algorithm and determine a PMI for each base station, in step S45.

For example, the scheduler is operated such that a precoding matrix included in the precoding matrix set $DUR_{max}[W_1, W_2, \ldots, W_N]$ is first selected and a precoding matrix included in the precoding matrix set $DUR_{min}[W_1, W_2, \ldots, W_N]$ is not selected. That is, the scheduler may allocate a precoding vector or matrix suitable for a base station corresponding to each corresponding base station ID or restrict use of the precoding vector or matrix.

In step S44, the scheduler may preset a variable reference value considering channel environment or system environment and compare $DUR_{max}$ or $DUR_{min}$ with the reference value.

In step S46, the scheduler transmits the PMI for each base station determined in step S45 to a corresponding base station through the backbone network.

Figure 3:
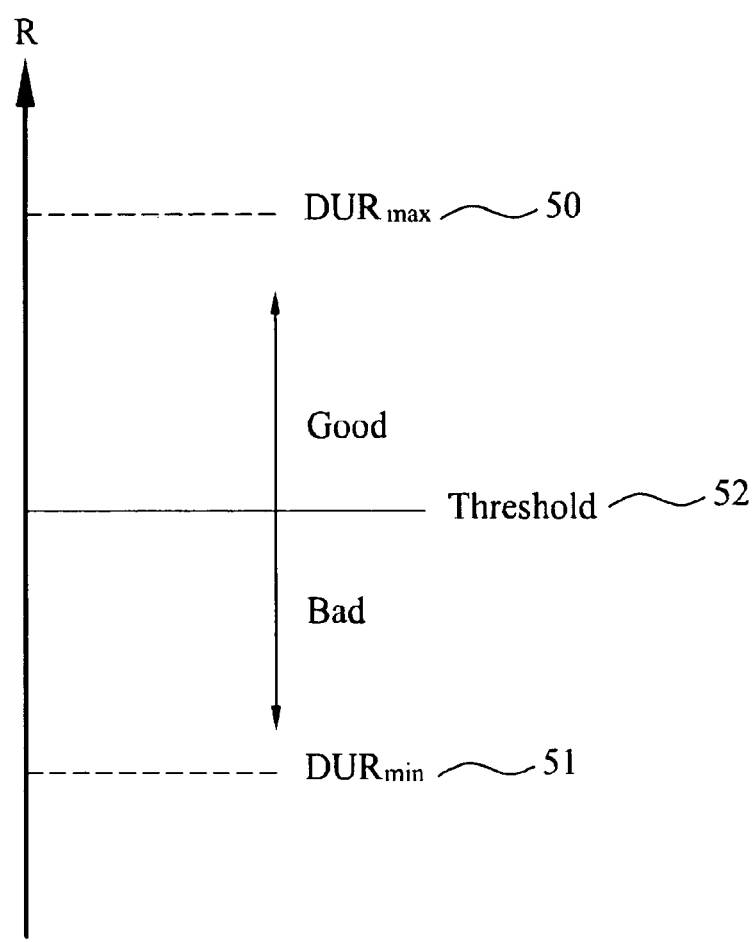
FIG. 3 illustrates an example of a method for determining a precoding matrix index of each base station in a scheduler according to an exemplary embodiment of the present invention.

FIG. 3 illustrates an example of a method for determining a PMI of each base station in a scheduler according to an exemplary embodiment of the present invention The scheduler, which performs a coordination function between base stations in a cell boundary, sets a reference value to obtain precoding matrices $W_1, W_2, \ldots, W_N$ for respective base stations as illustrated in FIG. 3 and can perform scheduling such that an SINR of a received signal of each mobile station may be maximized, using PMI information transmitted to base stations from mobile stations located in edges of a cell.

The scheduler serves to receive and apply precoding matrix set information which can obtain maximum performance in each base station. However, in some cases, precoding cannot be performed according to the precoding matrix set information that can obtain maximum performance in consideration of a relationship with other neighboring base stations.

For example, although a base station $BS_1$ transmits precoding matrix set information including a precoding matrix index PMI_1 as precoding matrix set information of maximum performance, a base station $BS_2$, which is a neighboring base station, may transmit the precoding matrix set information including the precoding matrix index PMI_1 as precoding matrix set information of minimum performance.

Then although the base station $BS_1$ can not use the precoding matrix index PMI_1, the scheduler may inform the base station so as to use a precoding matrix which is recombined by other precoding matrices approximating to the maximum performance.

For example, the scheduler may determine a PMI suitable for each base station according to $DUR_{max}$ 50 and $DUR_{min}$ 51. That is, the scheduler may perform scheduling with respect to a specific base station to cause mobile stations within a cell thereof not to use a PMI leading to $DUR_{min}$ 51 or a similar value thereto or may recommend that the mobile stations use a PMI leading to $DUR_{max}$ 50 or a similar value thereto. In this case, the PMI transmitted to each base station may guarantee performance above a threshold value 52 set by the scheduler.

When scheduling a PMI for each base station as illustrated in FIG. 3, if scheduling is performed to restrict a PMI generating strong interference between base stations, a collision problem may occur while neighboring mobile stations in edges of a cell try to restrict the PMI. In this case, the mobile station can solve the collision problem using a look-up table which quantizes sizes of interference signals to be controlled to a given range of interference amount. Namely, the mobile station informs the base station of a corresponding quantization level by comparing look-up table values, and the scheduler allocates priority to the mobile stations according to the quantization level, thereby preventing collision of PMIs between mobile stations.

In more detail, the mobile station measures channel signals of a serving base station and neighboring base stations generating interference with a signal received from the serving base station and calculates an interference value based on the measured channel signal, for transmission to the serving base station. The interference value may include signal to interference plus noise ratio (SINK), normalized interference power, and interference over thermal (IoT).

The interference value may be used to determine priority in selecting a PMI in each base station. Interference value information received by the serving base station is used to determine priority for selection of a precoding matrix index in each base as described above and priority information may be transmitted to neighboring base stations through a backbone network. The interference value information may be transmitted to the serving base station from the mobile station, together with ID information of a corresponding base station generating interference.

Meanwhile, if the base station scheduler desires to allocate PMI information to each base station in order to reduce overhead for an uplink control signal, the scheduler may demand that corresponding mobile stations feed back quantization level information of interference amount, only when a PMI to be restricted or suppressed collides with a PMI of a counterpart base station.

As described above, a method for transmitting PMI in which interference is maximized and/or a PMI in which interference is minimized in a multi-cell environment may be used by combination with a method for transmitting interference value information used to determine priority in selecting a PMI in each base station.

In another aspect of the present invention, if it is necessary to raise reception performance according to quality of service (QoS) demanded by a mobile station in an edge of a cell, a collaborative multi-cell MIMO scheme rather than an interference elimination mode in a multi-cell environment may be applied. In one embodiment, a mobile station may transmit, to a serving base station, mode conversion information which can be used in selecting one of a collaborative MIMO mode or an inter-cell interference mitigation mode. Such mode conversion may be determined by a base station or a network end rather than the mobile station and may be signaled to the mobile station.

Figure 4:
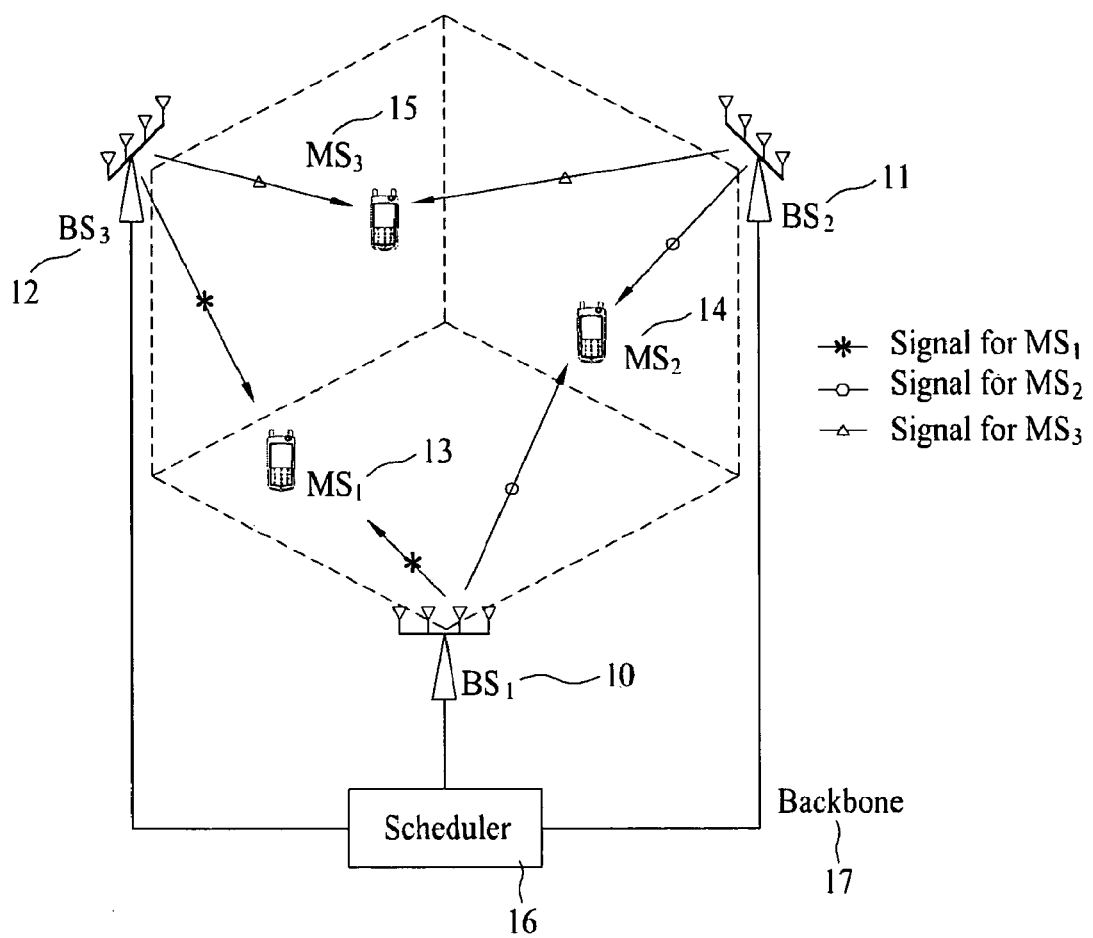
FIG. 4 illustrates signal transmission and reception in a communication system to which a collaborative MIMO scheme is applied in a multi-cell environment.

FIG. 4 illustrates signal transmission and reception in a communication system to which a collaborative MIMO scheme is applied in a multi-cell environment.

According to this embodiment, MIMO is applied using a plurality of base stations in a multi-cell environment, unlike conventional application of MIMO in a single-cell environment to achieve diversity, single-user MIMO, and multi-user MIMO.

Referring to FIG. 4, a mobile station ($MS_1$) 13 receives signals from base stations ($BS_1$ and $BS_3$) 10 and 12, a mobile station ($MS_2$) 14 receives signals from base stations ($BS_1$ and $BS_2$) 10 and 11, and a mobile station ($MS_3$) 15 receives signals from base stations ($BS_2$ and $BS_3$) 11 and 12. Data transmitted to a mobile station from a plurality of base stations is constructed in a scheduler considering the plurality of base stations and then is transmitted to each base station through an interface between networks, for example, through a backbone network 17.

Signals received from the respective base stations may be the same or different. When the same data is received from the respective base stations, a diversity gain can be obtained.

When different data is received from the respective base stations, a multiplexing gain can be obtained by raising a data transmission rate, that is, data processing amount.

Similarly to raising reception performance by single-user MIMO or multi-user MIMO through multiple antennas of a base station in the same cell, a mobile station may implement diversity, single-user MIMO, or multi-user MIMO by receiving a signal of the same channel from base stations located in a plurality of neighboring cells. Especially, a mobile station in an edge of a cell which is liable to be subject to interference from neighboring cells may implement, when employing this situation in reverse, diversity, single-user MIMO, or multi-user MIMO by receiving a signal for the same channel from neighboring base stations.

Since a plurality of independent streams are transmitted to multiple mobile stations or a specific mobile station, when a collaborative MIMO scheme is applied to implement single-user MIMO or multi-user MIMO, a plurality of base stations may receive channel state information (CSI) from the mobile stations and estimate a channel using the CSI. Each base station independently generates an antenna weight based on the channel estimation result, and precodes and transmits the antenna weight.

Figure 5:
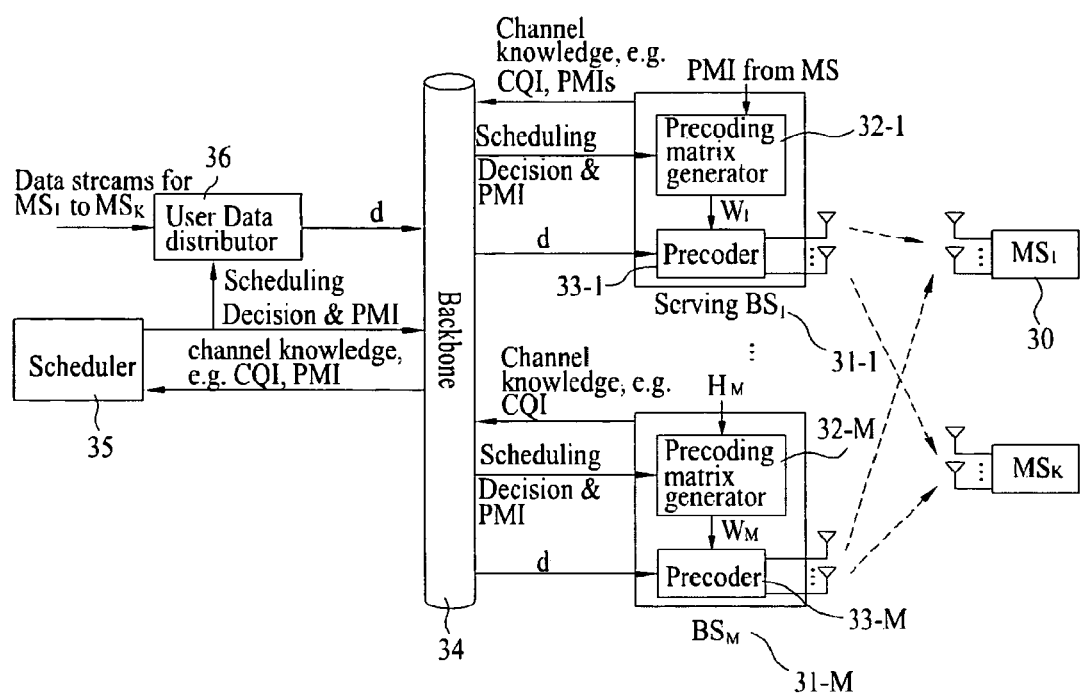
FIG. 5 illustrates a signal transmission and reception method in a communication system to which a collaborative MIMO scheme is applied according to an exemplary embodiment of the present invention.

FIG. 5 illustrates a signal transmission and reception method in a communication system to which a collaborative MIMO scheme is applied according to an exemplary embodiment of the present invention.

Referring to FIG. 5, M base stations, including a serving base station 31-1 and (M−1) neighboring base stations, transmit a data stream d to a mobile station 30 by a collaborative MIMO scheme. In this case, the serving base station 31-1 and the neighboring base stations including $BS_M$ 31-M transmit, to the mobile stations, the data stream d which is constructed based on information received by a scheduler 35 and transmitted through a backbone network 34.

Data transmitted to each base station may be the same or different data. However, the data transmitted to each base station may be data which is appropriately coded and modulated according to channel information transmitted from each base station.

Construction of the base station 31-1 among a plurality of base stations will now be described in detail. The base station 31-1 receives the data stream d through the backbone network 34 and then precodes the data stream d before transmission to the mobile station 30. A precoding matrix generator 32-1 generates a weight or a precoding matrix used to perform precoding.

The precoding matrix generator 32-1 may generate the weight or precoding matrix using a codebook. For example, the mobile station 30 transmits PMI as feedback information and the precoding matrix generator 32-1 may generate the precoding matrix using the PMI received as the feedback information from the mobile station 30.

A precoder 33-1 performs precoding by multiplying the generated weight or precoding matrix by the data stream d. The precoder 33-1 then transmits the precoded signal to the mobile station 30.

According to this embodiment, when a base station, specifically the serving base station 31-1 receives the PMI from the mobile station as the feedback information, the serving base station 31-1 also receives PMIs of neighboring base stations including the base station 31-M, as well as a PMI thereof, so that each base station can generate the precoding matrix using the PMI.

The serving base station transmits the PMIs for the base stations to corresponding base stations through the backbone network 34. The backbone network 34 may be a communication network defined to transmit/receive and share information between a plurality of neighboring base stations. The scheduler 35 may coordinate transmission of the PMIs.

The scheduler 35 may receive, through the backbone network 34, channel information obtained through a signal received by each base station from a mobile station and may construct data transmitted to a corresponding mobile station using the channel information. The channel information may include channel quality information (CQI) and rank information, as well as the above-described PMI. Through the channel information, the scheduler 35 selects optimal coding and modulation schemes suitable for a channel state of a corresponding mobile station and may transmit data constructed using the coding and modulation schemes to each base station through the backbone network 34.

According to the above-described embodiment, if it is determined that collaborative MIMO can obtain a received SINR for target QoS rather than removing interference, corresponding information, for example, one bit may be added for transmission to a serving base station. In this case, the mobile station measures channel signals of a serving base station and neighboring base stations for performing a collaborative MIMO scheme and reports, to the serving base station, PMI to be used in each base station for collaborative MIMO based on the measured channel signals. The PMI transmitted to each base station for collaborative MIMO may be PMI capable of maximally obtaining a diversity gain when the same signal is received from collaborative base stations and/or may be a PMI capable of maximally obtaining a multiplexing gain when independent signals are received from collaborative base stations. For example, if a base station receives corresponding information from a mobile station, the base station may recommend use of PMI information of base stations included in the precoding matrix set $DUR_{min}$ [$W_1, W_2, \ldots, W_N$], which has been recommended to restrict use in an interference elimination mode, to raise performance using collaborative MIMO.

For collaborative MIMO, corresponding base stations use a precoding vector or matrix having $DUR_{min}$ transmitted from a scheduler and synchronize a transmission frequency band with a base station to which a mobile station desiring a service belongs. The base stations transmit the same data received from the corresponding mobile station or an independent data stream to the corresponding mobile station. Accordingly, the corresponding mobile station raises reception performance for the same signal or increases a reception data transmission rate by receiving a plurality of independent data streams, thereby performing a collaborative MIMO mode.

In an inter-cell interference mitigation mode, a precoding matrix corresponding to a PMI is suppressed as much as possible, employing the same precoding matrix set $DUR_{min}$ [$W_1, W_2, \ldots, W_N$]. Therefore, inter-cell interference of a mobile station desiring a service can be minimized.

Although a mobile station located in an edge of a cell experiences weak reception performance due to inter-cell interference, a codebook-based closed-loop precoding scheme may be applied according to the above-described embodiment.

A mobile station can determine PMIs for base stations considering a channel characteristic of neighboring base stations and transmit precoding matrix set information to a serving base station. A scheduler can then perform scheduling using the precoding matrix set information.

The scheduler performs scheduling by determining a PMI used between base stations through the precoding matrix set information and thus interference from neighboring cells can be mitigated, thereby improving a received SINR performance of a mobile station.

Meanwhile, the precoding matrix set information may be applied to codebook-based MIMO for neighboring base stations. Then a unitary characteristic between signals transmitted to a mobile station can be maintained to raise reception performance.

The precoding matrix set information is applicable to codebook-based beamforming for neighboring base stations. Then strength of a signal transmitted to a mobile station can be amplified. Moreover, interference which may be generated between signals of a plurality of base stations can be mitigated.

The exemplary embodiments of the present invention may be achieved by various means, for example, hardware, firmware, software, or a combination thereof. In a hardware configuration, a method for transmitting precoding information in a collaborative MIMO communication system according to the exemplary embodiment of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method for transmitting precoding information in a collaborative MIMO communication system according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for a mobile station to receive a signal using a collaborative multiple-input multiple-output (Co-MIMO) scheme, the method comprising:
    measuring a channel from a serving base station and collaborative base stations including at least one neighboring base station, wherein the collaborative base stations perform the collaborative MIMO scheme together with the serving base station;
    determining precoding matrix indexes for each of the collaborative base stations and reporting the precoding matrix indexes to the serving base station; and
    receiving a same signal or independent signals from the collaborative base stations,
    wherein the precoding matrix indexes for each of the collaborative base stations are determined by sequentially selecting a prescribed number of precoding matrix indexes in which a multi-cell diversity gain or a multi-cell multiplexing gain is maximally obtained, when the mobile station collaboratively receives the same signal or independent signals from each of the collaborative base stations.

2. The method according to claim 1, wherein the precoding matrix indexes for each of the collaborative base stations are selected based on a predetermined codebook in a system.

3. The method according to claim 1, wherein the collaborative base stations share resource allocation information for the mobile station and transmit the same signal or independent signals to the mobile station using a common resource.

4. The method according to claim 1, wherein the precoding matrix indexes reported to the serving base station are respectively transmitted to the collaborative base stations from the serving base station via an inter-network interface.

5. The method according to claim 1, wherein the mobile station receives the same signal from the collaborative base stations when the collaborative base stations are operated in a multi-cell diversity mode.

6. The method according to claim 1, wherein the mobile station receives the independent signals from the collaborative base stations when the collaborative base stations are operated in a multi-cell multiplexing mode.

7. A method for a specific base station to transmit a signal together using a collaborative multiple-input multiple-output (Co-MIMO) scheme, the method comprising:
    receiving, from a mobile station that receives a signal using the collaborative MIMO scheme, precoding matrix indexes for the specific base station and collaborative base stations including at least one neighboring base station, wherein the collaborative base stations performing the collaborative MIMO scheme together with the specific base station;
    transmitting the precoding matrix indexes for each of the collaborative base stations to the at least one neighboring base station through an inter-network interface; and
    transmitting the same signal or independent signals to the mobile station together with the at least one neighboring base station,
    wherein the precoding matrix indexes for each of the collaborative base stations are determined by sequentially selecting a prescribed number of precoding matrix indexes in which a multi-cell diversity gain or a multi-cell multiplexing gain is maximally obtained, when the mobile station collaboratively receives the same signal or independent signals from the collaborative base stations.

8. The method according to claim 7, wherein the precoding matrix indexes for each of the collaborative base stations are selected based on a predetermined codebook in a system.

9. The method according to claim 7, wherein the collaborative base stations share resource allocation information for the mobile station and transmit the same signal or independent signals to the mobile station using a common resource.

10. The method according to claim 7, wherein the specific base station transmits the same signal to the mobile station together with the at least one neighboring base station, when the collaborative base stations are operated in a multi-cell diversity mode.

11. The method according to claim 7, wherein the specific base station transmits the independent signals to the mobile station together with the at least one neighboring base station, when the collaborative base stations are operated in a multi-cell multiplexing mode.

* * * * *